US009626609B1

(12) United States Patent
Ferguson

(10) Patent No.: US 9,626,609 B1
(45) Date of Patent: Apr. 18, 2017

(54) ASSET CREATION FROM HARDWARE ASSET TAGS USING A MOBILE DEVICE

(71) Applicant: Flexera Software LLC, Itasca, IL (US)

(72) Inventor: Timothy Charles Ferguson, Melbourne (AU)

(73) Assignee: Flexera Software LLC, Itasca, IL (US)

( * ) Notice: Subject to any disclaimer, the term of this patent is extended or adjusted under 35 U.S.C. 154(b) by 0 days.

(21) Appl. No.: 15/161,135

(22) Filed: May 20, 2016

(51) Int. Cl.
*G06Q 30/00* (2012.01)
*G06K 19/06* (2006.01)
*G06K 7/10* (2006.01)
*G06Q 10/08* (2012.01)
*H04L 29/08* (2006.01)
*H04W 76/02* (2009.01)

(52) U.S. Cl.
CPC ... *G06K 19/06037* (2013.01); *G06K 7/10722* (2013.01); *G06K 19/06028* (2013.01); *G06Q 10/087* (2013.01); *H04L 67/10* (2013.01); *H04W 76/02* (2013.01)

(58) Field of Classification Search
USPC ........................................ 235/385; 705/2, 28
See application file for complete search history.

(56) References Cited

U.S. PATENT DOCUMENTS

| | | | | |
|---|---|---|---|---|
| 2003/0233287 | A1* | 12/2003 | Sadler | G06Q 30/02 705/28 |
| 2008/0133486 | A1* | 6/2008 | Fitzgerald | G06F 9/455 |
| 2014/0217177 | A1* | 8/2014 | Bell | G06Q 10/08 235/454 |
| 2014/0288952 | A1* | 9/2014 | Smith | G06F 19/327 705/2 |
| 2015/0040001 | A1* | 2/2015 | Kannan | G06F 17/248 715/243 |

* cited by examiner

*Primary Examiner* — Daniel Hess
(74) *Attorney, Agent, or Firm* — Perkins Coie LLP

(57) ABSTRACT

Various of the disclosed embodiments concern computer systems, methods, and programs for extracting information from an asset tag that can be used to monitor the corresponding asset. An operator, e.g. employee of an enterprise, logs into an application executed by a mobile device that includes a camera. A tag template can then be manually selected by the operator or automatically selected by the application. The tag template is used during scanning to locate and identify machine-readable elements, human-readable elements, structural elements, or some combination thereof. Once the application registers a successful scan of the asset tag, the operator can review and confirm the information was extracted correctly. Generally, the extracted information is transmitted to an asset management system, which creates a database entry that allows the asset to be continually monitored by the enterprise, e.g. each time the asset tag is subsequently scanned.

24 Claims, 12 Drawing Sheets

ASSET CREATION FROM HARDWARE ASSET TAGS USING A MOBILE DEVICE

RELATED FIELD

Various embodiments relate generally to computing systems. More specifically, various embodiments relate to computing systems, methods, and programs for identifying and monitoring hardware assets by scanning asset tags.

BACKGROUND

Management of assets owned by an enterprise begins with the physical hardware being delivered to the enterprise. Protocols are often set for procurement, reception, deployment, etc., of the hardware. But enterprises have traditionally limited what information is gathered and maintained for those asset being used, e.g. by an employee of the enterprise. Consequently, enterprises usually have an incomplete understanding of ownership, location, and state of each asset and are unable to accurately monitor assets throughout their lifecycles.

Assets that are never properly reported to an inventory management system present assorted risks for an enterprise. A better understanding of certain characteristics could be used to optimize asset usage and value to the enterprise.

SUMMARY

Introduced herein are systems and methods for scanning an asset tag and extracting information that allows an asset to be tracked throughout its lifecycle. Information extracted from the asset tag is used to generate a database entry for the asset that can be monitored, updated, etc. Various embodiments described herein allow an operator to log into an application used for creating a tag template and scanning the asset tag. The application includes a user interface (UI) that is presented on a display of a mobile device, which includes a camera and is communicatively coupled to an asset management system.

In some embodiments, an operator initiates a live view of the asset tag to create a template that aids in readily extracting information from the asset tag. The template includes one or more markers that indicate the presence of machine-readable elements, human-readable elements, structural elements, or some combination thereof. Creation of the template can be partially or entirely automated. For example, in some embodiments the application automatically identifies elements on the asset tag, while in other embodiments the operator manually locates the elements. Once the arrangement of the markers has been finalized, the tag template is saved for future use. The tag template can be stored locally, e.g. by the mobile device, or remotely, e.g. by the asset management system.

The operator may also be able to initiate a live view of the asset tag to scan one or more elements and extract relevant information about the corresponding asset. Typically, the operator begins by selecting an appropriate tag template and aligning the markers with the elements on the asset tag. Once the application registers a successful scan of the asset tag, the operator can review the information and confirm it was extracted correctly.

The information is then transmitted to the asset management system, which can create a database entry for the asset using some or all of the transmitted information. The asset management system is able to track enterprise assets by monitoring changes made to the database entries. For example, a subsequent scan may show the asset is no longer being used by its intended enterprise division or for its intended purpose.

DETAILED DESCRIPTION

Mechanisms are described herein for tracking assets having software-resident functionality that are owned by an enterprise. More specifically, information scanned and extracted from asset tags can be used to link the corresponding asset with one or more licensed resources that are or will be used by the asset as it moves through its lifecycle in the enterprise. The licensed resources are linked to the asset subject to and consistent with license terms that pertain to the licensed resources. The asset tag is typically scanned once the asset is received by the enterprise. An asset management system, which includes a database composed of the extracted information, can be used to monitor ownership, location, state, etc., of each enterprise-owned asset.

The embodiments described herein allow an asset to be tracked throughout the entirety of its lifecycle, namely, from reception, e.g. at the loading dock, to decommissioning of the asset. Scanning at such an early stage allows the enterprise to more accurately map or link software to hardware, i.e. the assets. A better understanding of asset ownership, location, state, etc., can also be used to improve the user experience, optimize licensing, etc. For example, effective software licensing requires an accurate understanding of usage and/or ownership of a hardware asset, particularly in second use and multiple use scenarios.

System Topology Overview

Figure 1:
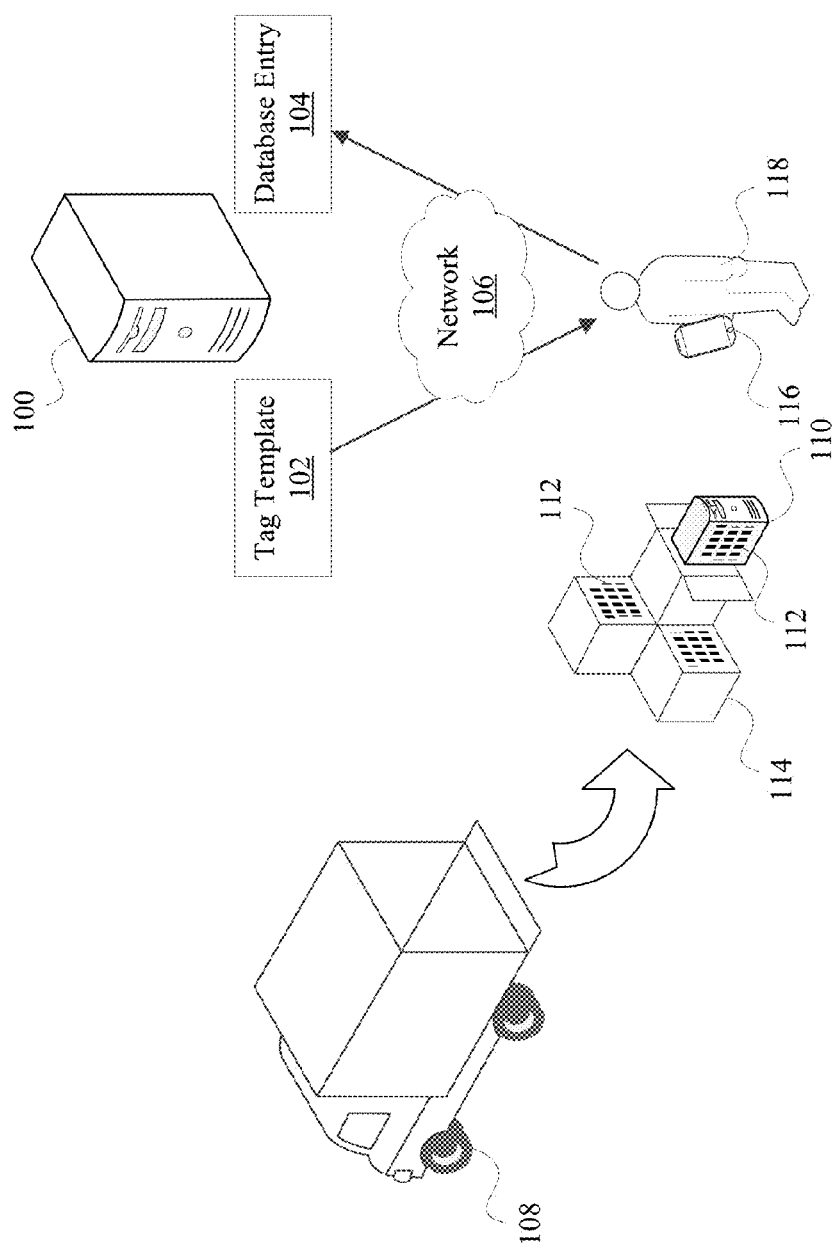
FIG. 1 is a system-level diagram of an asset management system during acquisition of an asset according to various embodiments.

FIG. 1 is a system-level diagram of an asset management system 100 during acquisition of an asset 110 according to various embodiments. Management and tracking begins with an asset 110 being delivered, e.g. by a delivery entity 108, to the enterprise. When assets are acquired by the enterprise, an operator 118 can scan an asset tag 112 associated with the asset 110. The operator 118 may elect to scan all or some subset of the assets acquired by the enterprise. As illustrated by FIG. 1, the asset tag 112 can be located on packaging 114 in which an asset is shipped, on the asset 110 itself, or both. In some instances, the operator 118 scans unique asset tags 112 that are affixed to the packaging 114 and the corresponding asset 110.

The operator 118 scans the asset tags 112 using a mobile device 116 that includes a camera and a display configured to present a user interface (UI). The mobile device 116 is communicatively coupled to an asset management system 100 over a network 106, such as the Internet, a local area network (LAN), a wide area network (WAN), a point-to-point dial-up connection, etc. The mobile device 116 could be, for example, a smartphone, personal digital assistant (PDA), phablet, tablet, hybrid device, e.g. laptop-tablet combination, laptop computer, etc. Further yet, the mobile device 116 is typically configured to host a third-party software application that can be used to scan the asset tags 112.

More specifically, the operator 118 scans the asset tag 112 using a tag template 102. The template can be associated with a particular manufacturer, supplier, asset type, asset identifier, etc. The tag template 102 is often one of a group of templates hosted by the asset management system 100. However, the templates could also be stored on the mobile device 116 or another distinct network-accessible storage. In some embodiments, a subset of templates is stored locally on the mobile device 116 for quicker retrieval. The appropriate subset could be manually selected by the operator 118 or automatically identified based on total usage, recent usage, etc.

Once the application has been initiated and a template has been selected, information about the asset 110 is extracted from the asset tag 112 and transmitted to the asset management system 100. The asset management system 100 can use the information to identify or create a unique identifier (ID) for the asset 110 and populate a database entry 104 for the asset 110. The unique ID differentiates the asset 110 from all other assets owned by the enterprise.

The asset management system 100, meanwhile, is responsible for monitoring database entries corresponding to assets owned by an enterprise. In some embodiments, the asset management system 100 is centrally-hosted. For instance, the asset management system 100 may be a software as a service (SaaS) application stored on a distributed cloud-based system or a private centralized server system. Other topologies are also possible, such as an asset management system 100 that is managed by a third-party that tracks assets for more than one enterprise.

Asset Tag Template Creation

Figure 2A:
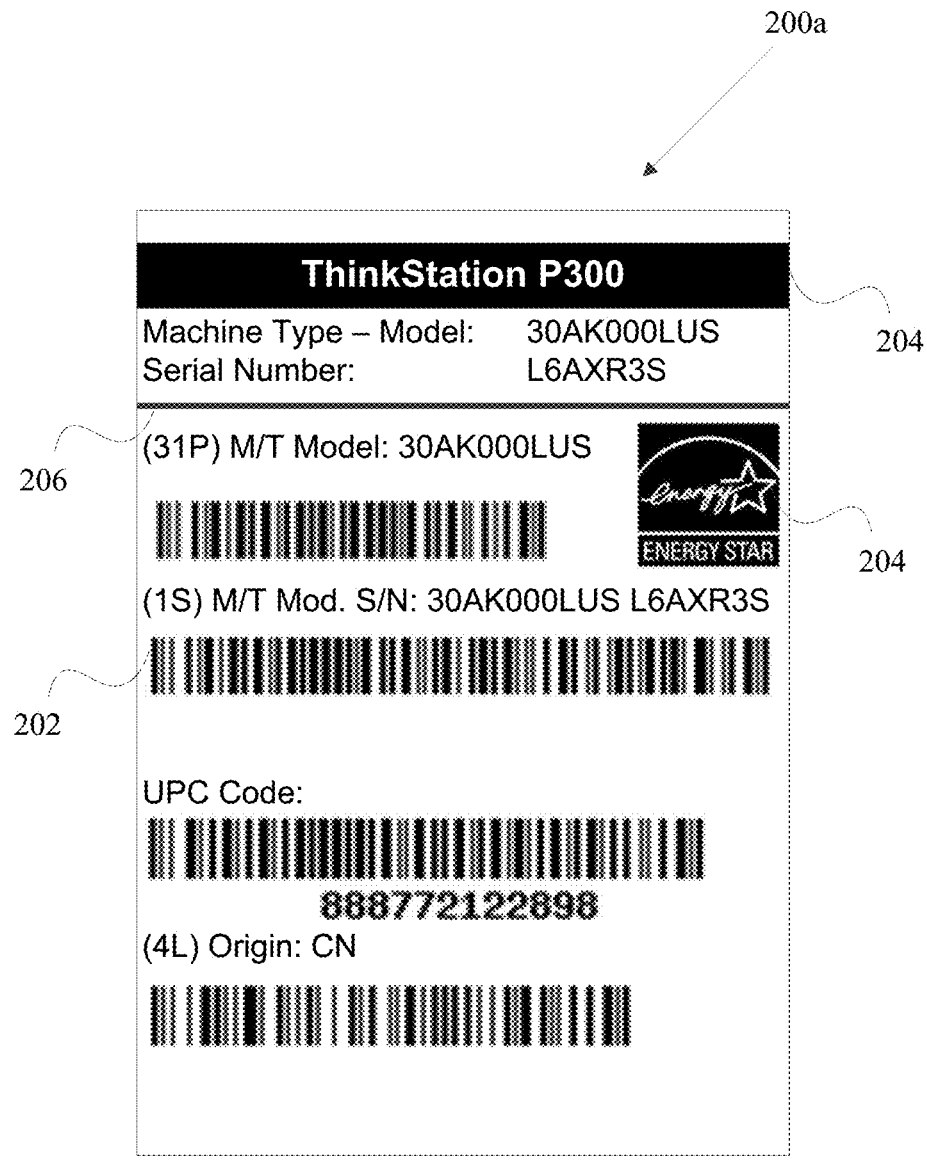
FIGS. 2A-C are examples of asset tags as may be scanned in various embodiments.
Figures 2B, 2C:
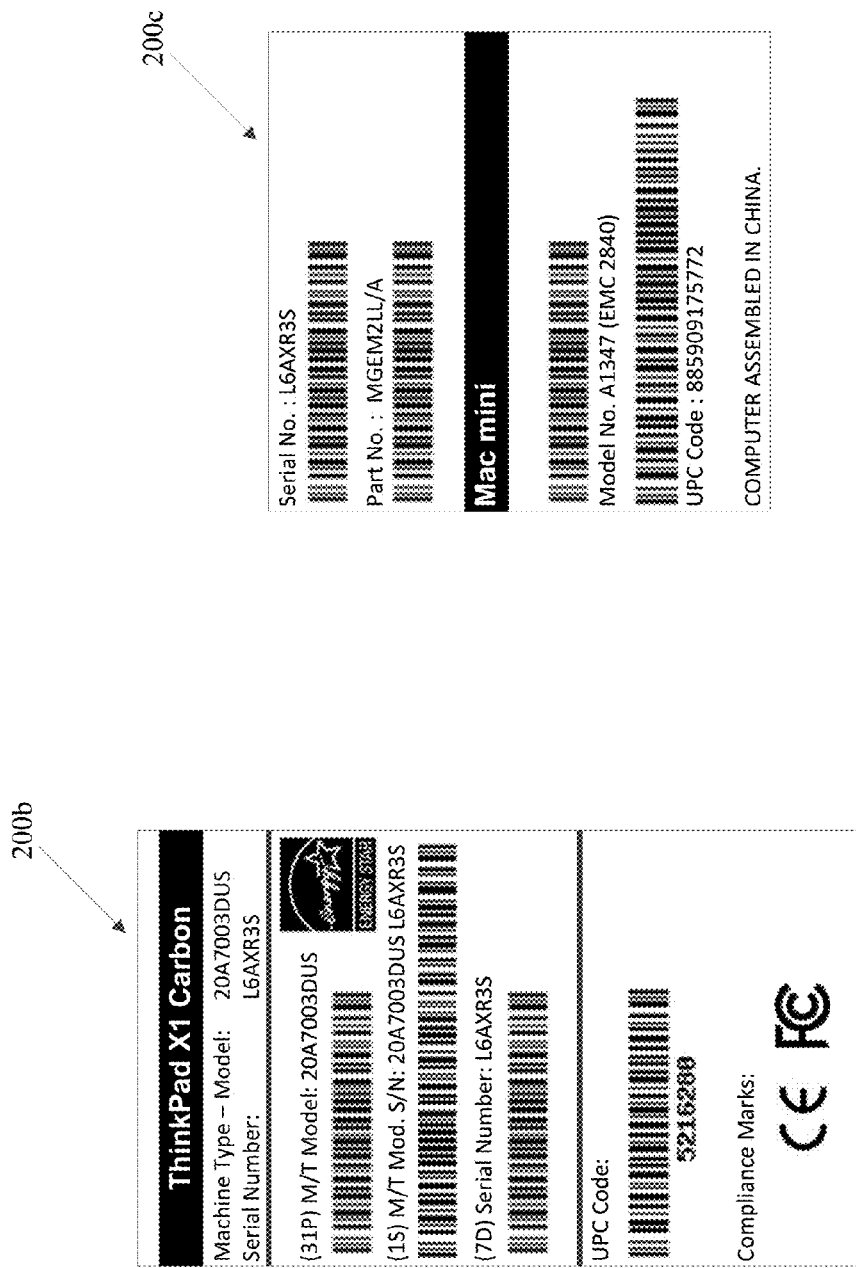

FIGS. 2A-C are examples of asset tags 200*a-c* as may be scanned in various embodiments. Oftentimes, the asset tags 200*a-c* are composed of some combination of machine-readable elements 202, human-readable elements 204, and structural elements 206. Machine-readable elements 202 are printed or electronically-displayed codes that are designed to be read and interpreted by a device. Machine-readable elements, e.g. bar codes and QR-codes, can include extractable information, such as various asset properties and characteristics. Human-readable elements 204, such as text and images, may be co-located with the machine-readable elements and identified using various optical character recognition (OCR) techniques. Structural or formatting elements 206, such as horizontal lines and solid bars, may also be used to identify unique tag layouts.

The machine-readable elements 202, human-readable elements 204, and structural elements 206 (collectively referred to herein as "the elements") convey information that can be useful in identifying and/or describing the corresponding asset. The information can include product or model type, name, number, manufacturer, Universal Product Code (UPC), international or European article number (EAN), operating system, etc. For example, asset tag 200*a* includes a human-readable element specifying the asset name ("ThinkStation® P300") and machine-readable elements specifying the model, serial number, UPC, etc.

An asset tag can be attached to packaging, e.g. a box, in which the corresponding asset is shipped, the asset itself, or both. Distinct asset tags could, for instance, be affixed to both the packaging and the asset itself. In such embodiments, the operator may elect to scan both tags, particularly if either of the distinct tags convey unique information. An operator will generally only scan asset tags corresponding to assets having software-resident functionality, i.e. assets capable of executing software and being part of the runtime environment or capable of influencing license status.

Templates can be created that assist in extracting information from the elements that make up each asset tag. But the elements are often arranged in unique layouts or configurations, as shown in FIGS. 2A-C. Consequently, templates may be associated with one or more particular manufacturers, suppliers, asset types, etc.

Figure 3:
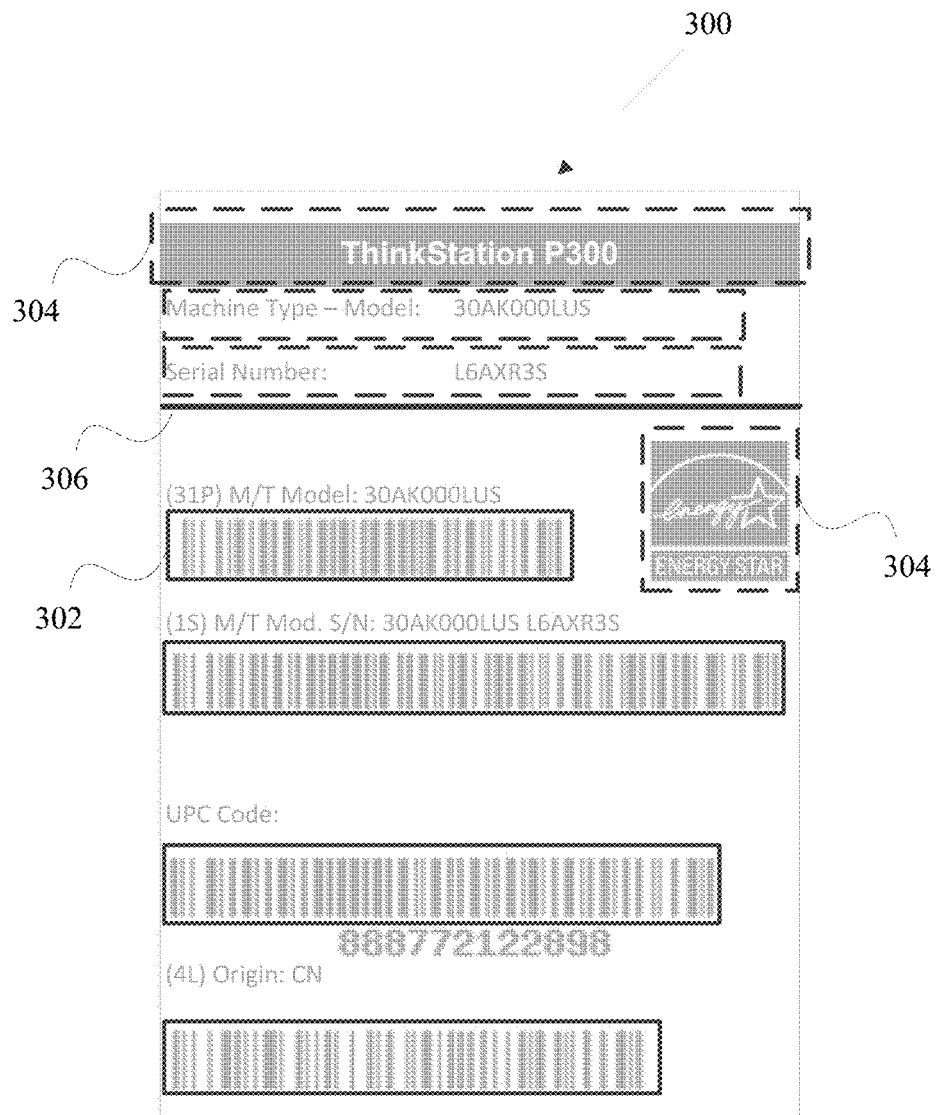
FIG. 3 is an example of an asset tag template as can be created in some embodiments.

FIG. 3 is an example of an asset tag template 300 as may be created in some embodiments. As described below with respect to FIGS. 3-5, the tag template 300 can be used to extract information from asset tags, e.g. tags 200*a-c* of FIGS. 2A-C. Each tag template 300 is a unique arrangement of one or more markers mapped to the elements of an asset tag, e.g. machine-readable elements 302, human-readable elements 304, and structural elements 306. A tag template can include markers for some or all of these elements. The markers are arranged such that they overlay, i.e. align with, the elements and identify those areas of the asset tag that include extractable information.

When a tag template is viewed, e.g. on the display of a mobile device, the markers may be visually distinguishable based on color, line style, etc. For example, a solid line may be used to represent machine-readable elements 302, while a dashed line is used to represent human-readable elements 304. Similarly, a red line could be used to represent machine-readable elements 302, while a green line represents human-readable elements 304.

Figures 4A, 4B, 4C:
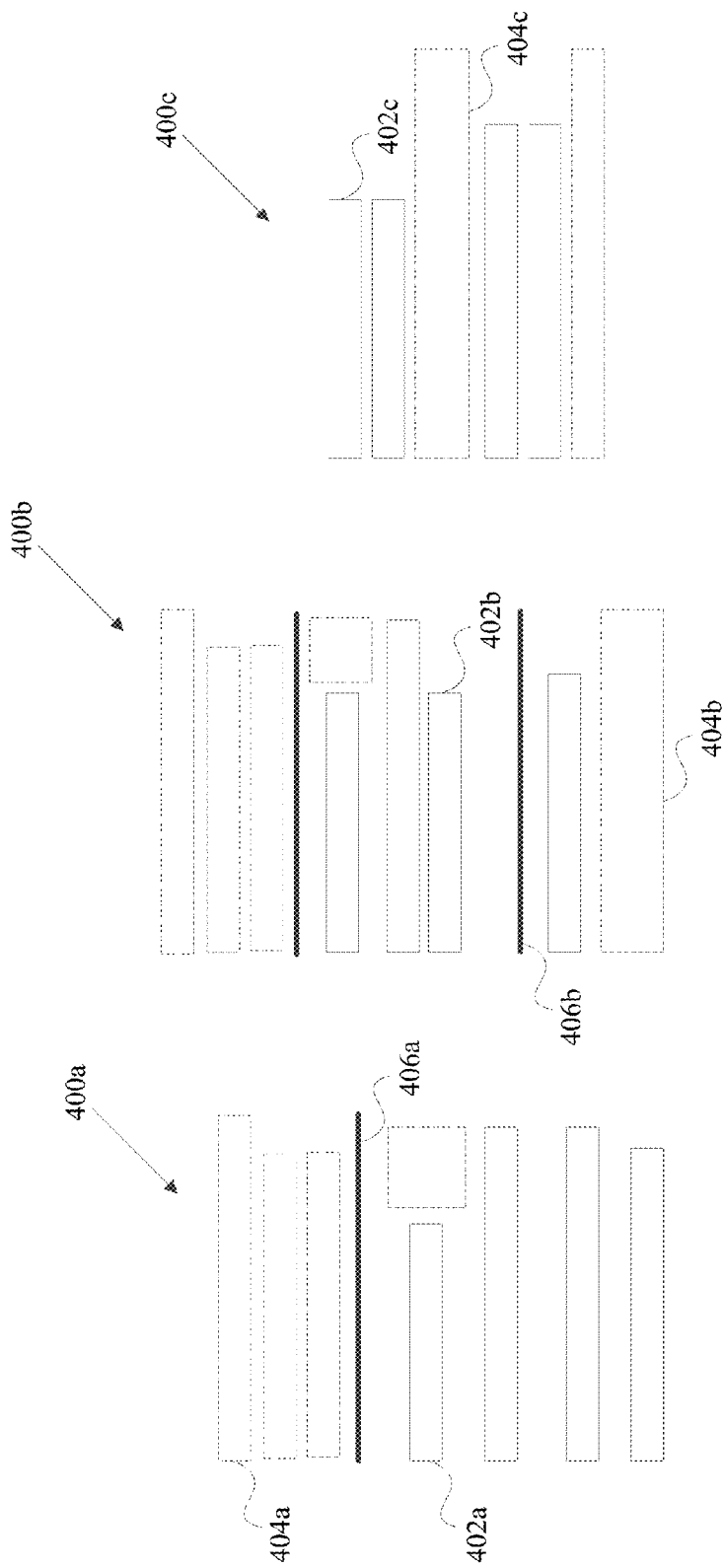
FIGS. 4A-C are examples of asset tag templates as may be generated in accordance with various embodiments.

FIGS. 4A-C are examples of asset tag templates 400*a-c* as may be generated in accordance with various embodiments. Each template is a unique arrangement of markers that aid in scanning an asset tag and extracting information about the corresponding asset. The markers can be for machine-readable elements 402*a-c*, human-readable elements 404*a-c*, and structural elements 406*a-b*. A template could include markers for some or all of these element types.

Oftentimes, the markers are labeled or tagged based on what information can be extracted from the corresponding element. For instance, marker 404*a* may be tagged as the asset name, while marker 402*a* is tagged as the asset serial number. The human-readable elements 404*a-c* could include text and/or images, such as symbols or logos.

Figure 5:
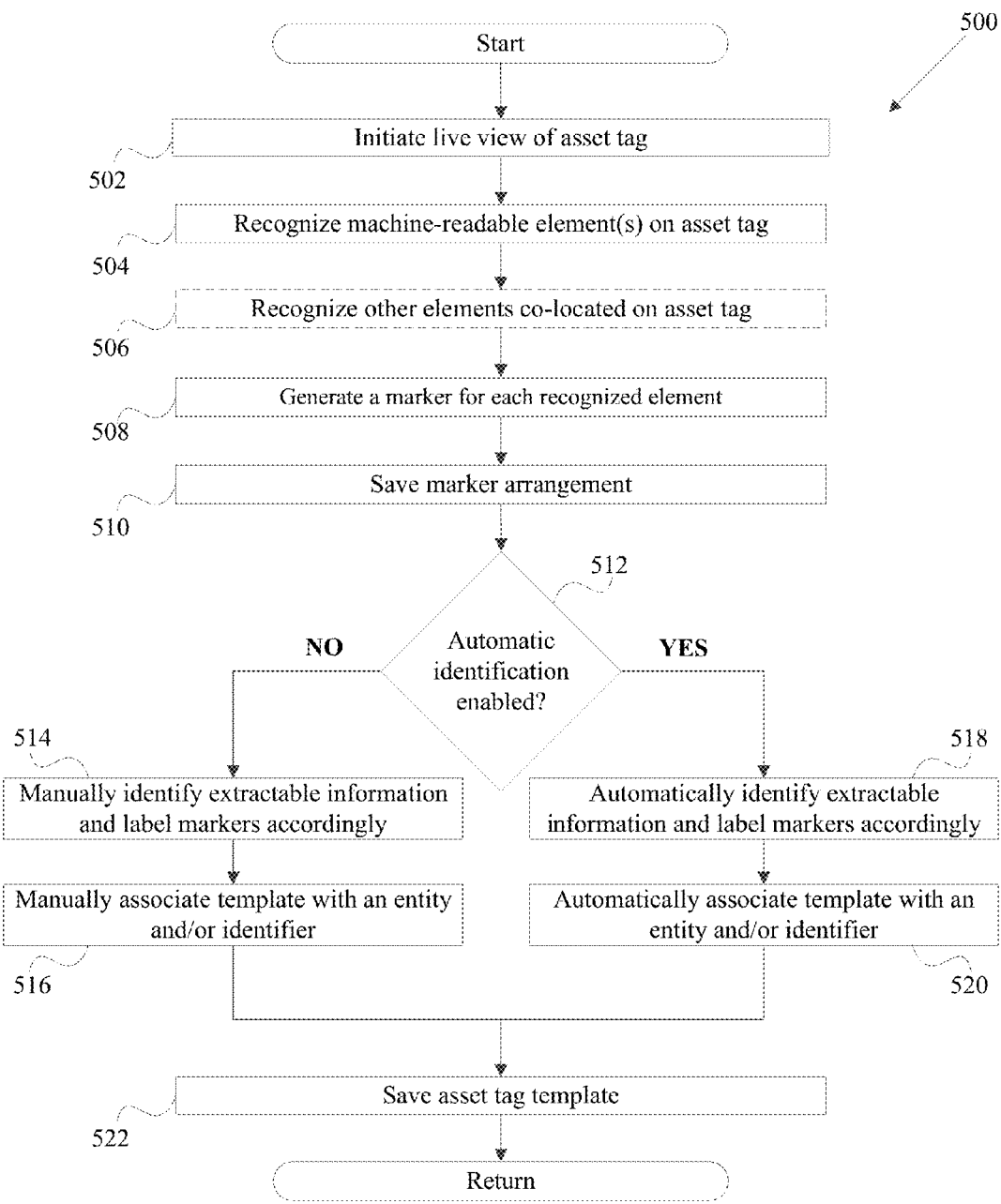
FIG. 5 is a flow diagram illustrating a process for creating an asset tag template.

The templates 400*a-c* are typically stored in a centralized database, e.g. asset management system 100 of FIG. 1. The centralized database may share the templates 400*a-c* with other mobile devices within the enterprise that are responsible for scanning the tags. In some embodiments, additional, i.e. non-scannable, properties that are common to a template are also associated with the template in the database. For example, the manufacturer and/or supplier could be manually entered by the operator and used to populate the database entry for the asset in the centralized database FIG. 5 is a flow diagram illustrating a process 500 for creating an asset tag template as may occur in some embodiments. At block 502, an operator logs into an application on a mobile device and initiates a live view of an asset tag. The live view may be a feed recorded by the mobile device's camera. In some embodiments, the operator instead captures a still-frame or static image, i.e. a photograph, of the asset tag that is used to create the tag template.

At block 504, one or more machine-readable elements on the asset tag are recognized by the operator, the application, or both. Enterprises often receive asset tags having unique layouts and, consequently, some level of configuration may be necessary to locate the machine-readable elements. In some embodiments, recognition is an entirely manual process in which the operator identifies machine-readable elements by selecting portions of the live video feed, while in other embodiments the application automatically locates machine-readable elements. The recognition process could also be partially automated. For example, the application may automatically locate machine-readable elements and then require manual confirmation that all machine-readable elements were correctly recognized.

At block 506, human-readable elements and/or structural elements co-located on the asset tag can be identified manually, automatically, or some combination thereof. These other elements, however, need not be recognized in the same manner as the machine-readable elements. For instance, machine-readable elements may be automatically recognized, while human-readable elements are manually identified by the operator. At block 508, a marker is generated for each recognized element. As described above with respect to FIG. 3, the markers allow the operator to accurately align the tag template with scannable elements of an asset tag during a scanning session. The markers may also be identified as being for a particular element type, e.g. machine-readable or human-readable, and/or visually distinguished based on color, line style, etc. At block 510, the marker arrangement is saved for future use.

At block 512, the application determines whether automatic identification of asset tag content is enabled. If automatic identification is not enabled, the operator manually identifies the information that can be extracted from some or all of the recognized elements and labels the corresponding markers accordingly, as shown at block 514. For example, the operator could label a marker as corresponding to the asset serial number. The operator may also delete certain unnecessary or superfluous markers from the saved arrangement. At block 516, the operator manually associates the marker arrangement with one or more manufacturers, suppliers, asset types, asset identifiers, etc. It may be desirable in some instances to associate a template with some combination of entities and/or identifiers, e.g. a manufacturer (Lenovo®) and an asset identifier (ThinkStation®).

However, if automatic identification is enabled, the application automatically identifies the information that can be extracted from some or all of the recognized elements and labels the corresponding markers according, as shown at block 518. In some embodiments, the application automatically identifies the content of machine-readable elements by analyzing co-located human-readable elements, e.g. words and images, and/or the syntax, e.g. length or scheme, of the machine-readable element. For example, a 12-digit alphanumeric sequence consisting of hexadecimal symbols could be automatically identified as the media access control (MAC) address of the asset. Various OCR techniques can be used to process the human-readable elements.

The mobile device could also access a source of known values, e.g. a database, to more accurately identify what information is extractable from the machine-readable elements. More specifically, an element could be identified by comparing it with a database of known asset properties, such as model names, serial numbers, and UPCs. At block 520, the application automatically associates the template configuration with one or more manufacturers, suppliers, asset types, asset identifiers, etc., based on the machine-readable elements, the human-readable elements, or both.

At block 522, the tag template, which includes the marker arrangement and any additional information that has been manually or automatically identified, is saved. Generally, the tag template is one of many templates maintained by an asset management system, e.g. on a network-accessible server. Creation of a tag template may ultimately be an entirely manual process, an entirely automatic process, or some combination thereof.

Asset Management

Figure 6:
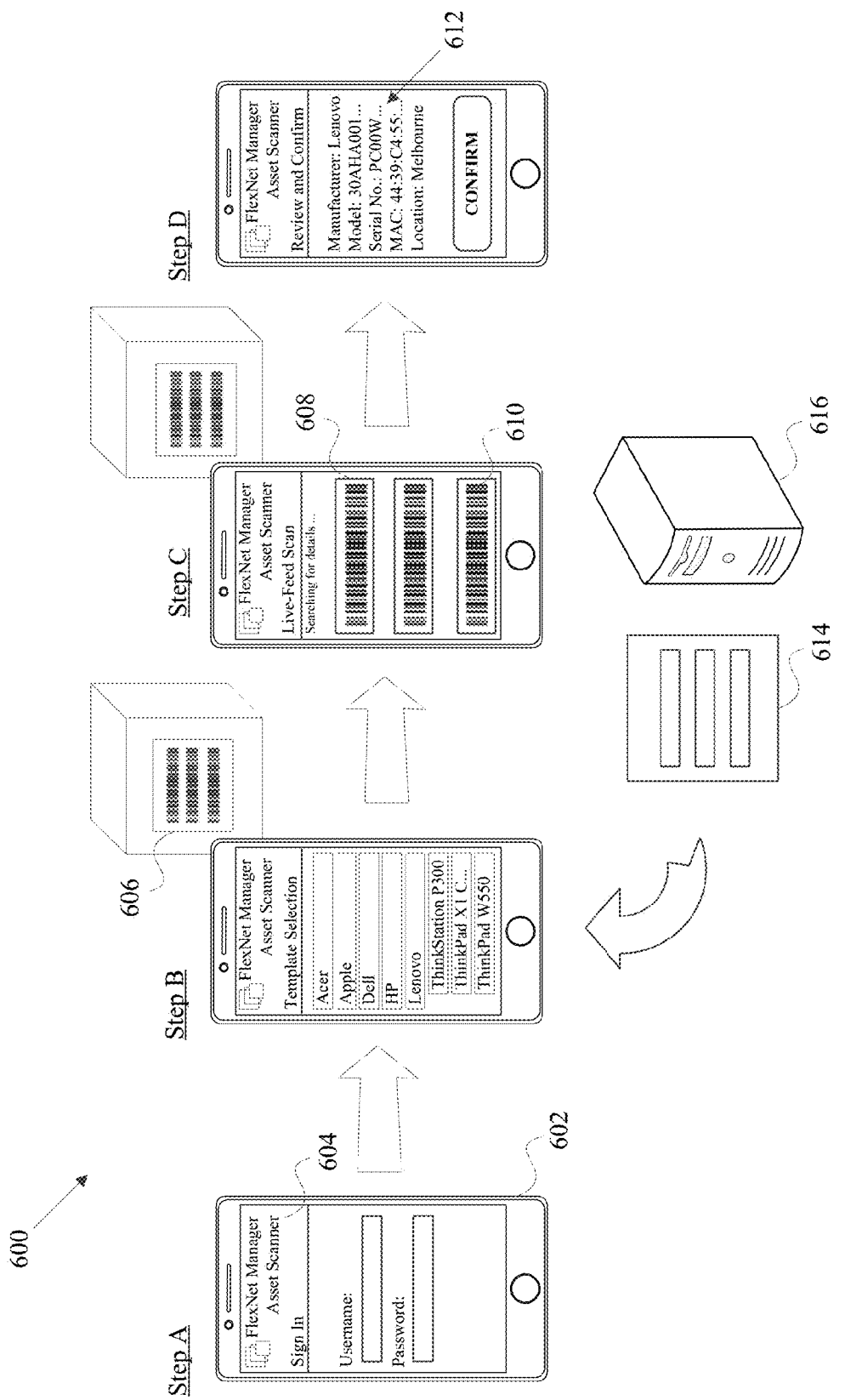
FIG. 6 is a pictorial illustration of a process for extracting information about an asset from an asset tag.

FIG. 6 is a pictorial illustration of a process 600 for extracting information 612 about an asset from an asset tag 606 as may occur in various embodiments. The information 612 can be used to generate and/or populate a database entry that is monitored throughout the asset's lifecycle. At step A, an operator signs into an application 604 that is installed on and executed by a mobile device 602. The mobile device 602 could be a smartphone, PDA, phablet, tablet, hybrid device, laptop computer, etc. The login process may require the operator enter identifying information, such as a username or employee identifier. Other supplemental information, such as geographic location or MAC address of the wireless router being used by the mobile device 602, could be automatically retrieved from the mobile device upon signing in and/or scanning an asset. The identifying information and/or the supplemental information may be used to populate the database entries of assets scanned during a session.

At step B, the operator selects an appropriate tag template 614 based on one or more asset characteristics, e.g. manufacturer, product type. Alternatively, the application 604 may be configured to automatically identify an appropriate template 614 by performing a preliminary scan of the asset tag 606. Further yet, the process could include both manual and automatic aspects. For instance, the operator may specify the manufacturer, e.g. Lenovo®, and the application may automatically identify the asset model, e.g. ThinkStation® P300. Templates can be created for a variety of manufacturers, retailers, product models, etc., and are generally managed by an asset management system 616 that is communicatively coupled to the mobile device 602. Thus, the mobile device 602 can request and store a limited subset of templates, rather than store all possible alternative templates.

At step C, the operator initiates a live view of the asset tag 606 to begin scanning. The preconfigured template 614 is used to generate an electronic screen overlay that can be applied to the live view to assist in aligning the markers 608 with the readable elements 610 of the asset tag. The overlay could also indicate the areas of the asset tag the application is expected to scan and interpret. OCR may be used to identify and analyze human-readable elements, which may be used in addition to, or instead of, machine-readable elements on some asset tags.

Once the application registers a successful scan of the asset tag 606, the application allows the operator to review and confirm the information 612 was extracted correctly, as shown at step D. The operator may also be able to modify the extracted information, input supplemental information, etc. Some or all of the information can then be transmitted to the asset management system 616. In some embodiments, the application 604 allows the operator to capture a still-frame or static image, i.e. photograph, of the asset tag for additional processing or later manual confirmation.

Figure 7:
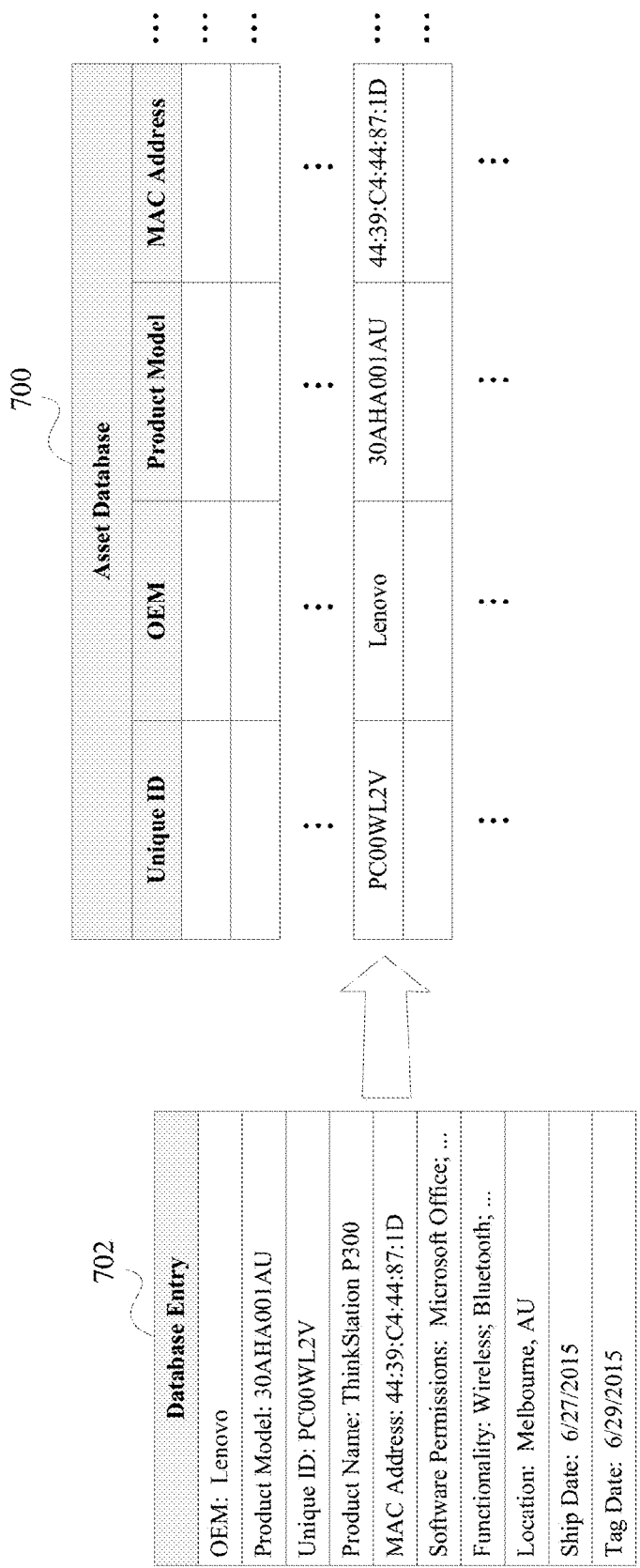
FIG. 7 is an example of an asset database that is maintained and monitored by an asset management system and used to track assets belonging to an enterprise.

FIG. 7 is an example of an asset database 700 that is maintained and monitored by an asset management system and used to track assets belonging to an enterprise. Once asset-specific information is received from a mobile device, the asset management system can create a new database entry 702 or modify an existing database entry corresponding to the asset.

The database entry 702 includes information extracted from an asset tag, supplemental information input by an operator or scraped from the mobile device used to scan the asset tag, or some combination thereof. As described above with respect to FIG. 6, the supplemental information may be provided by the operator during the review process. For example, the supplemental information could include:
  intended owner of the asset;
  intended purpose of the asset, e.g. virtual machine host, desktop;
  intended geographic location of the asset; and
  intended cost center or enterprise division to which the asset will be assigned.

The supplemental information can be manually input, e.g. typed, by the operator, selected from a limited subset of options, e.g. via a drop-down menu or searchable grid of possible values, or retrieved from another source. That is, the asset management system may be configured to retrieve information from another network-accessible source, such as a distinct server that hosts enterprise files and records or licensed software credentials.

The populated database entries are used to manage and monitor enterprise assets from reception to retirement, i.e. decommissioning of the asset. For instance, the asset management system may generate a new database entry for a newly-acquired asset and then update the database entry each time the corresponding tag is subsequently scanned. An operator or another enterprise employee could be notified if an irregularity is discovered while scanning, e.g. asset outside of intended location. In some embodiments, the database entries are logically grouped by shipment, service/warranty agreement, software permissions, etc.

The asset management system generally produces a unique ID for each newly-received asset that differentiates the asset from other assets owned by the enterprise. The unique ID can be created based on the information extracted from the asset tag, assigned from an internal enterprise list, manually added by the operator, etc. The unique ID could, for example, be located on a second enterprise-specific tag that is added by the operator after receiving the asset. In such embodiments, both the asset tag and the enterprise-specific tag may be scannable.

The unique ID follows a single asset throughout its lifecycle. Consequently, the unique ID can be used to accurately apply policies and/or reclaim software when an asset is taken out of service. For example, the unique ID could be used to ensure the asset is used in a particular manner, location, etc. As another example, the unique ID could be used to easily revoke and reallocate software licenses when the asset is decommissioned.

The asset management system may be configured to synthesize the content of various enterprise systems and resources, including the asset database 700. For instance, in some embodiments the information stored within each database entry is used to match scanned assets to inventory reported by an inventory system running on the mobile device or another computing system.

Figure 8:
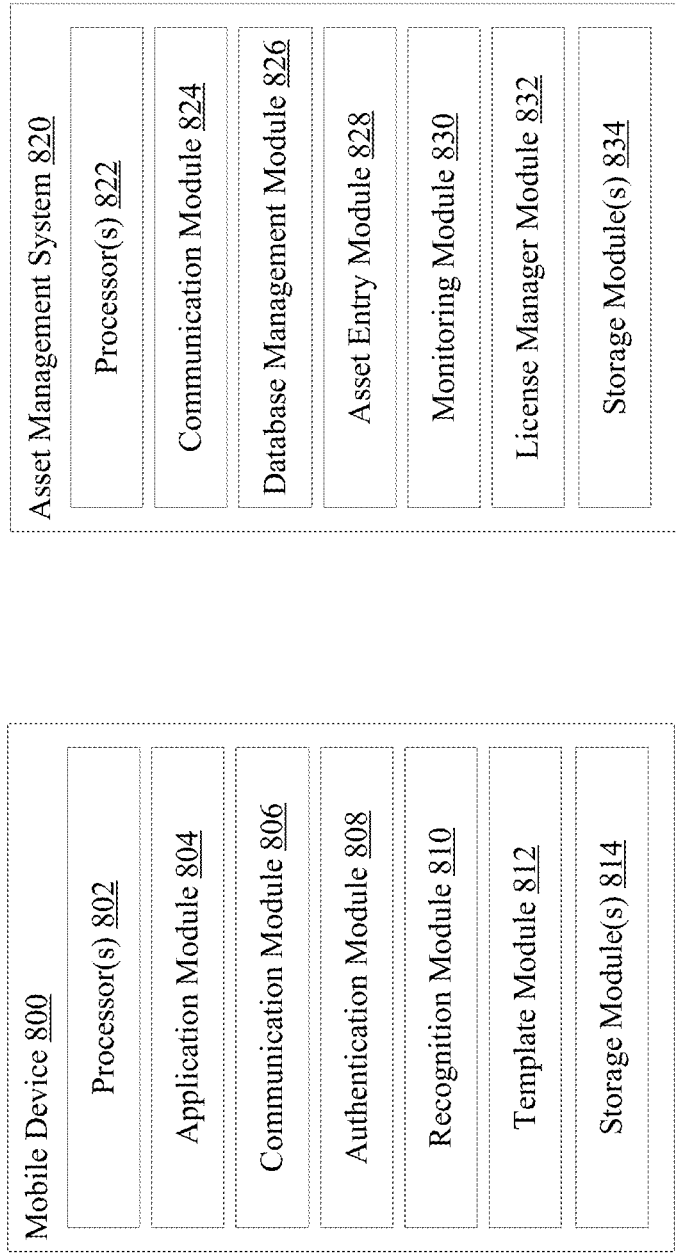
FIG. 8 is a block diagram with exemplary components of a network-accessible mobile device and an asset management system according to some embodiments.

FIG. 8 is a block diagram with exemplary components of a network-accessible mobile device 800 and an asset management system 820 according to various embodiments. The mobile device 800 can include one or more processors 802, an application module 804, a communication module 806, an authentication module 808, a recognition module 810, a template module 812, and one or more storage modules 814. The asset management system 820 can include one or more processors 822, a communication module 824, a database management module 826, an asset entry module 828, a monitoring module 830, a license manager module 832, and one or more storage modules 834.

Other embodiments of the mobile device 800 and asset management system 820 may include some, all, or none of these modules and components, along with other modules and/or components. Some embodiments may incorporate two or more of these modules into a single module and/or associate a portion of the functionality of one or more of these modules with a different module. Further yet, some tasks could be performed by either the mobile device 800 or the asset management system 820 and, consequently, the responsible modules and/or components may be present in either or both locations.

Storage modules 814, 834 can be any device or mechanism used for storing information. In some embodiments, storage modules 814, 834 store instructions for running one or more modules, e.g. application module 804, on the one or more processors 802, 822. For example, storage module 814 may house some or all of the instructions needed to execute the functionality of the authentication module 808, recognition module 810, etc. Similarly, storage module 834 may house some or all of the instructions needed to execute the database management module 826, asset entry module 828, etc. Storage module 834 also generally includes asset tag templates and a database composed of entries for scanned assets.

The communication modules 806, 824 manage communication between internal components and modules as well as other devices, such as the mobile device 800 and the asset management system 820. The communication modules 806, 824 are also able to establish a communication link and facilitate the exchange of information between the mobile device 800 and the asset management system 820.

The application module 804 is configured to generate a UI that allows an operator to use the mobile device 800 to scan asset tags. For example, the operator can initiate a connection with the asset management system 820 and view an asset tag using the UI generated by the application module 804. The UI may require or permit the operator to enter login credentials that identify the operator. These login credentials are known by the operator and may be preexisting credentials also used for an enterprise's established authentication system. In some embodiments, the authentication module 808 validates the credentials by comparing them to a known record that is stored locally, e.g. in storage module 814, or remotely, e.g. in storage module 834.

The recognition module 810 is configured to locate one or more elements of an asset tag, as described above with respect to FIG. 5. The elements can include machine-readable, human-readable, and structural elements. In some embodiments the recognition module 810 is configured to automatically recognize the elements, while in other embodiments the operator manually locates the elements. Thus, the recognition process can be partially or entirely automated. The recognition module 810 may also be configured to identify what information can be extracted from the elements.

The template module 812 is configured to create asset tag templates based on the elements located and/or identified by the recognition module 810. Generally, the template module 812 labels the markers that make up a tag template according to the information that can be extracted from the corresponding elements. As described above with respect to FIGS. 3-4, the tag templates can be generated by the mobile device 800 and then transmitted to the asset management system 820 for storage.

The asset management system 820, meanwhile, can include a database management module 826, asset entry module 828, monitoring module 830, and license manager module 832 that allow assets to be closely monitored throughout their lifecycles. In some embodiments, the database management module 826 logically groups the database entries by shipment, service/warranty agreement, software permissions, etc., for more efficient monitoring. The asset entry module 828 is configured to create a new database entry each time a new asset is scanned by the mobile device 800 and update an existing entry when new information about an existing asset becomes available, e.g. an asset tag is scanned a second time.

The monitoring module 830 tracks whether a change has been made to any of the database entries and, if so, identifies the nature of the change. For example, the monitoring module 830 may detect an asset is being used for an unintended purpose or by an unintended party. The license manager module 832 is configured to track the software licenses allocated to each asset and ensure the software is executed in conformance with the license terms. The license manager module 832 may also be configured to automatically revoke licenses when an asset is set to be decommissioned.

Figure 9:
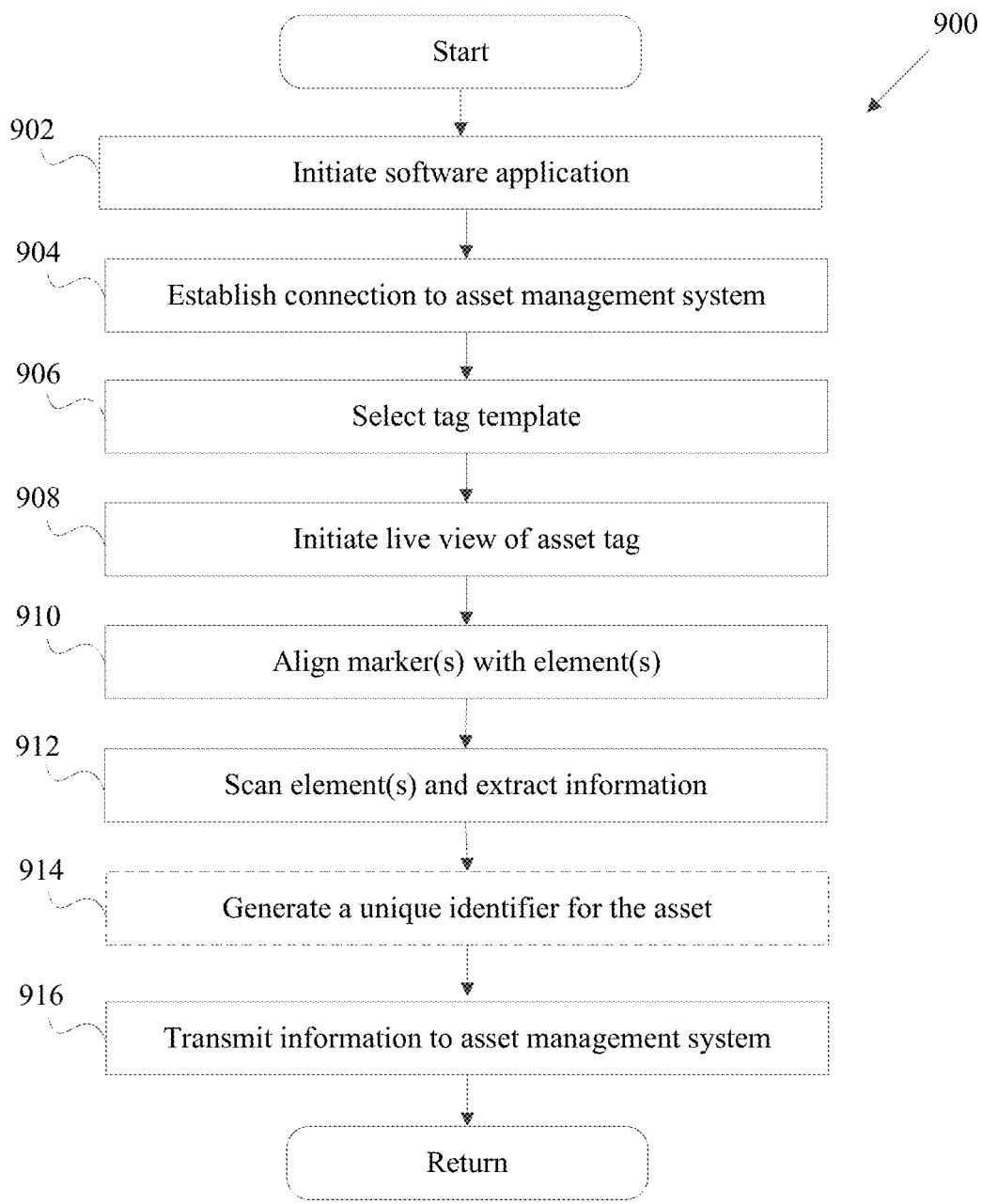
FIG. 9 is a flow diagram of a process for extracting information about an asset from one or more machine-readable codes.

FIG. 9 is a flow diagram of a process 900 for extracting information about an asset from one or more readable codes in accordance with various embodiments. At block 902, an operator initiates a software application installed on a mobile device. The software application is configured to aid in scanning an asset tag associated with a particular asset. The asset tag can be located on packaging in which the asset is delivered to an enterprise, on the asset itself, or both. At block 904, the operator establishes a connection with an asset management system, for example, by logging in through the application. The software application may require the operator enter credentials that are validated by the application or the asset management system. In some embodiments, the application is able to scan the asset tag while offline, i.e. not connected to the asset management system, and then subsequently establish a connection so the extracted information can be uploaded to the database.

At block 906, a tag template is manually selected by the operator or automatically selected by the application. The appropriate tag can be identified based on various asset characteristics of the asset, e.g. manufacturer, type, model. At block 908, the operator initiates a live view of the asset tag using the camera of the mobile device. The live view is presented to the operator from within the application. At block 910, the operator aligns one or more markers of the tag template with one or more elements of the asset tag. The application is prompted to begin scanning once the markers and elements are properly aligned. The one or more elements include machine-readable elements, human-readable elements, structural elements, or some combination thereof. Additionally or alternatively, the operator may align the markers with the elements and use the mobile device to capture a still-frame or static image, i.e. a photograph, of the asset tag.

At block 912, the one or more elements are scanned by the mobile device to extract information about the asset. For example, machine-readable elements, such as bar codes and QR-codes, could be scanned to identify the asset's product number, serial number, UPC, etc. Human-readable elements co-located on the asset tag may convey the same or different information. As shown at block 914, a unique ID is created by the mobile device or asset management system for the asset in some embodiments. The unique ID may be generated based on the information extracted from the asset tag, assigned from an internal enterprise list, etc. At block 916, some or all of the extracted information is transmitted to the asset management system. The asset management system uses the extracted information to establish and maintain a database of enterprise-owned assets.

Figure 10:
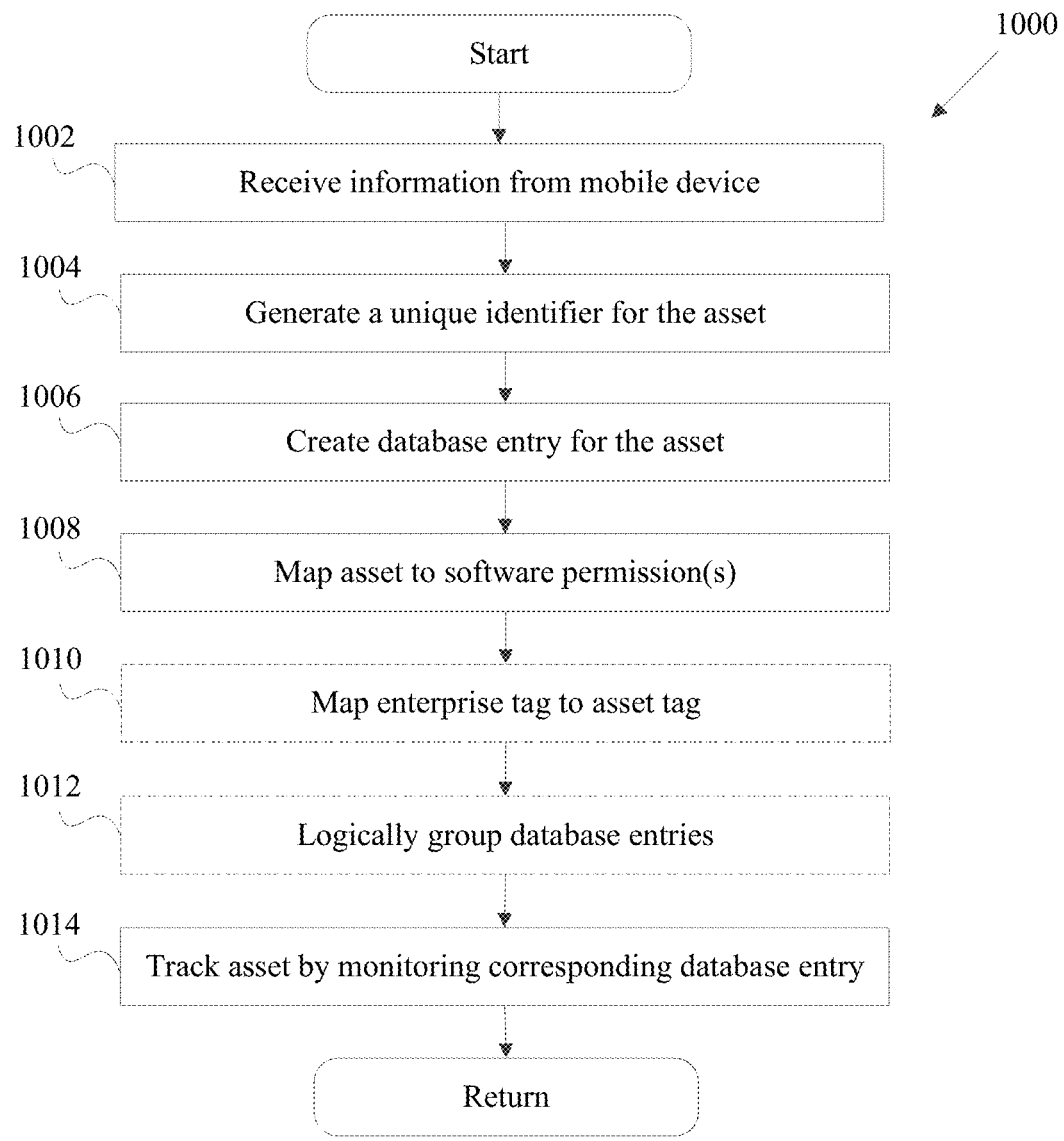
FIG. 10 is a flow diagram of a process for creating and maintaining a database that includes information about enterprise-owned assets.

FIG. 10 is a flow diagram of a process 1000 for creating and maintaining a database that includes information about enterprise-owned assets in accordance with various embodiments. At block 1002, an asset management system receives information from a mobile device used to scan an asset tag associated with an asset. The asset management system may be centralized and configured to do the majority of the processing. As described above with respect to FIG. 9, the asset management system generates a unique ID for the asset in some embodiments, as shown at block 1004.

At block 1006, the asset management system creates a database entry for the asset using the received information. If a database entry already exists for the asset, the asset management system can instead modify the entry by updating preexisting data fields, creating and populating new data fields, etc. At block 1008, the asset management system maps the asset to one or more software permissions. That is, the asset management system notes which software programs are permitted to be run by the asset and, consequently, is able to quickly modify permissions and easily enforce policies. In some embodiments, the asset management system associates or "marries" the asset tag with an enterprise tag within the database, as shown at block 1010. The enterprise tag, which may also be affixed to the asset, can include similar or different information than the asset tag. For example, the enterprise tag may include an assigned unique ID that is not included on the asset tag. The application is generally configured to scan both the asset tag and the enterprise tag.

The asset management system may also logically group the database entries, as shown at block 1012. The database entries can be grouped by shipment, service/warranty agreement, software permissions, intended purpose, cost center or enterprise division, etc. At block 1014, the asset management system tracks the asset by monitoring the corresponding database entry. For example, a notification can be sent, e.g. to the operator or database manager, when modifications are made to the database entry, the asset is being used for an unintended purpose, the asset is set to be decommissioned, etc.

Unless contrary to physical possibility, it is envisioned that the steps described above may be performed in various sequences and combinations. For instance, certain tasks may be allocated to the mobile device rather than the asset management system, and vice versa.

Figure 11:
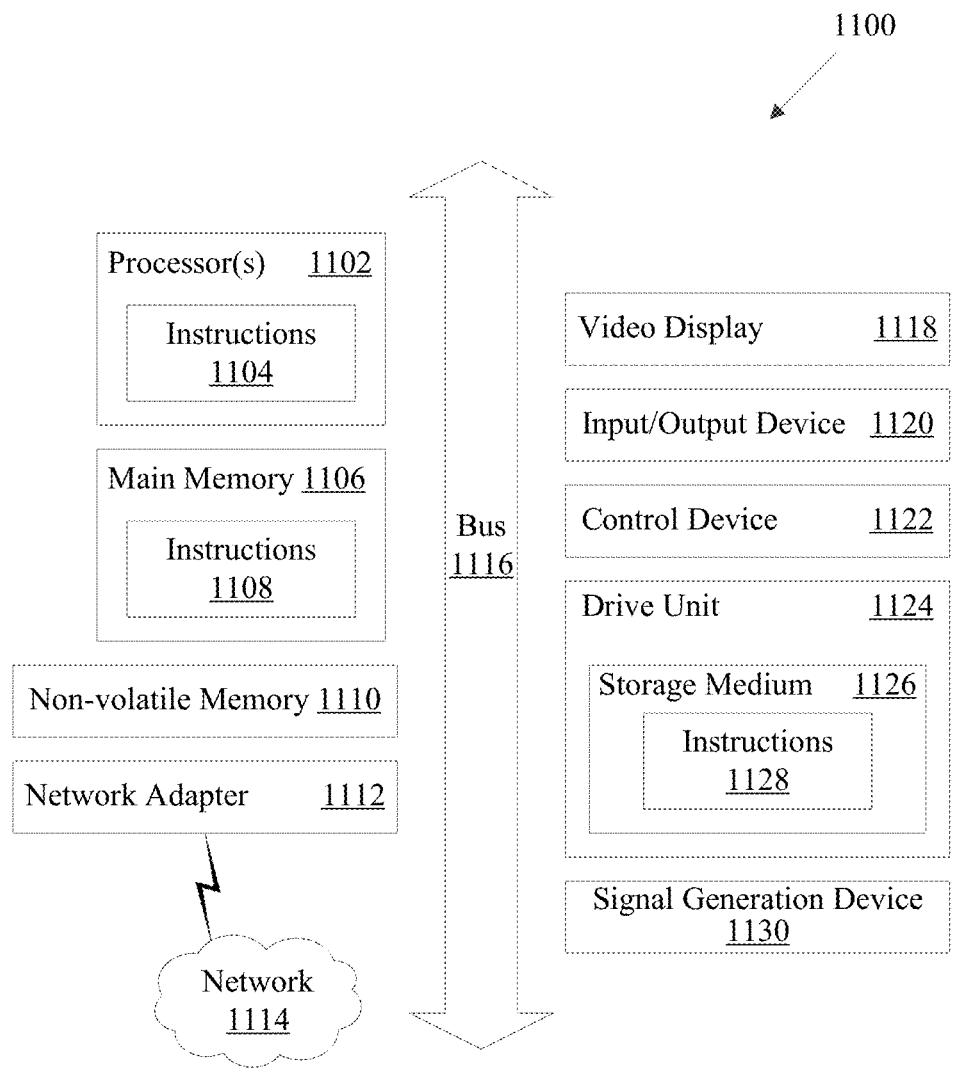
FIG. 11 is a block diagram illustrating an example of a computer system in which at least some of the operations described herein can be implemented.

FIG. 11 is a block diagram illustrating an example of a computer system 1100 in which at least some of the operations described herein can be implemented. The computer system 1100 may include one or more central processing units ("processors") 1102, main memory 1106, non-volatile memory 1110, network adapter 1112, e.g. network interfaces, video display 1118, input/output devices 1120, control device 1122, e.g. keyboard and pointing devices, drive unit 1124 including a storage medium 1126, and signal generation device 1130 that are communicatively connected to a bus 1116.

The bus 1116 is illustrated as an abstraction that represents any one or more separate physical buses, point to point connections, or both connected by appropriate bridges, adapters, or controllers. The bus 1116, therefore, can include, for example, a system bus, a Peripheral Component Interconnect (PCI) bus or PCI-Express bus, a HyperTransport or industry standard architecture (ISA) bus, a small computer system interface (SCSI) bus, a USB, IIC (I2C) bus, or an Institute of Electrical and Electronics Engineers (IEEE) standard 1394 bus, also called "Firewire."

The computer system 1100 may be a server computer, a client computer, a personal computer (PC), a user device, a tablet PC, a laptop computer, a personal digital assistant (PDA), a cellular telephone, an Android, an iPhone, an iPad, a Blackberry, a processor, a telephone, a web appliance, a network router, switch or bridge, a console, a hand-held console, a (hand-held) gaming device, a music player, any portable/mobile hand-held device, wearable device, or any machine capable of executing a set of instructions, sequential or otherwise, that specify actions to be taken by that machine.

The main memory 1106, non-volatile memory 1110, and storage medium 1126 are computer-readable storage media that may store instructions 1104, 1108, 1128 that implement at least portions of various embodiments. The instructions 1104, 1108, 1128 can be implemented as software and/or firmware to program processor(s) 1102 to carry out the actions described above.

The network adapter 1112 enables the computer system 1100 to mediate data in a network 1114 with an entity that is external to the computer device 1100, through any known and/or convenient communications protocol. The network adapter 1112 can include a network adaptor card, wireless network interface card, router, access point, wireless router, switch, multilayer switch, protocol converter, gateway, bridge, bridge router, hub, digital media receiver, and/or repeater.

The techniques introduced here can be implemented by, for example, programmable circuitry, e.g. one or more processors, programmed with software and/or firmware, entirely in special-purpose hardwired, i.e. non-programmable, circuitry, or in a combination of such forms. Special-purpose circuitry may be in the form of, for example, one or more application-specific integrated circuits (ASICs), programmable logic devices (PLDs), field-programmable gate arrays (FPGAs), etc.

The language used in the Detailed Description has been principally selected for readability and instructional purposes, and it may not have been selected to delineate or circumscribe the inventive subject matter. It is therefore intended that the scope of the technology be limited not by the Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method for identifying and managing assets belonging to an enterprise, the method comprising:
   accessing an application on a user device, wherein the user device includes a camera;
   causing a communication link to be established between the user device and an asset management system;
   logging into the asset management system by entering credentials using the application;
   initiating a live view of an asset tag acquired by the camera,
      wherein the asset tag is associated with an asset having software-resident functionality, and
      wherein the asset tag includes one or more machine-readable codes that convey information about the asset; and
   selecting an asset tag template from a plurality of templates, wherein the asset tag template includes one or more prearranged markers;
   aligning the one or more prearranged markers with the one or more machine-readable codes while observing the live view of the asset tag;
   causing the application to:
      extract the information from the asset tag by scanning the one or more machine-readable codes; and
      prompt an operator to confirm the information was extracted correctly; and
   transmitting at least some of the information to the asset management system to create a database entry in the asset management system for the asset, the database entry linking the asset with one or more licensed resources during the lifecycle for the asset, wherein the licensed resources are linked to the asset subject to and consistent with license terms that pertain to the licensed resources.

2. The method of claim 1, wherein the asset tag is affixed to the asset itself or packaging that secures the asset.

3. The method of claim 1, wherein the one or more licensed resources include software programs, software license keys, or both.

4. The method of claim 1, wherein the application is further configured to:
   generate a unique identifier for the asset based at least in part on the information extracted from the machine-readable codes,
   wherein the unique identifier distinguishes the asset from other assets monitored by the asset management system.

5. The method of claim 4, wherein the asset management system links the asset with the one or more licensed resources by mapping one or more software permissions to the unique identifier.

6. The method of claim 5, wherein the unique identifier allows the one or more software permissions to be readily revoked upon decommissioning of the asset.

7. The method of claim 1, wherein the one or more machine-readable codes include bar codes, QR-codes, or some combination thereof.

8. The method of claim 1, wherein the asset management system is implemented using a cloud-based software as a service (SaaS) model.

9. The method of claim 1, wherein the asset management system is stored on a private centralized server system.

10. The method of claim 1, wherein the information includes manufacturer, asset type, model name, model number, asset performance specifications, Universal Product Code, international article number, or some combination thereof.

11. The method of claim 1, wherein each of the plurality of templates is associated with a particular equipment manufacturer, retailer, hardware type, or product name.

12. The method of claim 1, wherein the application is further configured to:
prompt the operator to manually enter supplemental information through the application.

13. The method of claim 12, wherein the supplemental information includes intended owner of the asset, intended purpose of the asset, software programs permitted to be executed by the asset, cost center with which the asset is associated, geographic location of the asset, or some combination thereof.

14. The method of claim 1, wherein the application is configured to automatically record Global Positioning System (GPS) coordinates of the user device, an identifier for a wireless router presently being used by the user device, or both once the one or more machine-readable codes have been scanned.

15. A device for identifying enterprise assets to be monitored by an asset management system, the device comprising:
a display configured to present an asset scanning application to a user;
an input device configured to allow the user to interact with the asset scanning application;
a camera;
a communication module that communicatively couples the device and the asset management system;
a processor communicatively coupled to a memory, the processor operable to execute instructions stored in the memory; and
the memory, which includes specific instructions for identifying an asset having software functionality, wherein the specific instructions are configured to:
launch the asset scanning application;
prompt the user to enter login credentials that are validated by the asset scanning application;
initiate a live view of an asset tag using the camera, wherein the asset tag is associated with the asset and includes one or more machine-readable codes;
select a tag template that includes one or more markers, wherein the tag template is chosen from a plurality of templates based on arrangement of the one or more machine-readable codes, syntax of the one or more machine-readable codes, or both;
allow the user to align the one or more markers with the one or more machine-readable codes within the live view of the asset tag;
scan the one or more machine-readable codes and extract information about the asset; and
transmit at least some of the information to the asset management system, wherein reception of the information causes the asset management system to generate a unique identifier that differentiates the asset from other software-functional assets owned by an enterprise and create a database entry linking the asset with one or more licensed resources during the lifecycle of the asset, wherein the licensed resources are linked to the asset subject to and consistent with license terms that pertain to the licensed resources.

16. The device of claim 15, wherein the specific instructions are further configured to:
prompt the user to review and confirm the information extracted from the one or more machine-readable codes is correct.

17. The device of claim 15, wherein the specific instructions are further configured to:
scan one or more human-readable elements co-located with the one or more machine-readable codes on the asset tag;
perform optical character recognition on the one or more human-readable elements to extract additional information about the asset; and
transmit at least some of the additional information to the asset management system.

18. The device of claim 17, wherein the one or more machine-readable elements and the one or more human-readable elements are considered when selecting the tag template.

19. The device of claim 15, wherein the specific instructions are further configured to:
capture a static photograph of the asset tag upon scanning the one or more machine-readable codes; and
transmit the static photograph to the central asset management system.

20. The device of claim 15, wherein the specific instructions are further configured to:
allow the user to manually enter supplemental information about the asset,
wherein the supplemental information includes intended owner of the asset, intended purpose of the asset, software programs permitted to be executed by the asset, cost center with which the asset is associated, geographic location of the asset, or some combination thereof.

21. A centralized asset management system comprising:
a communication module configured to facilitate communication between the centralized asset management system and a mobile device;
a processor communicatively coupled to a memory, the processor operable to execute instructions stored in the memory; and
the memory, which includes specific instructions for identifying and tracking a hardware asset having software functionality, wherein the specific instructions are configured to:
maintain a plurality of tag templates within the memory, wherein each tag template includes one or more identifying characteristics;
transmit one of the plurality of tag templates to the mobile device;
receive information about the hardware asset from the mobile device,
wherein the information is derived from one or more machine-readable codes on an asset tag associated with the hardware asset, and
wherein the transmitted tag template includes one or more prearranged markers that aid in acquiring the information by being aligned with the one or more machine-readable codes while observing a live view of the asset tag;
generate a unique identifier for the hardware asset based at least in part on the information;
create a database entry for the hardware asset, wherein the database entry includes the unique identifier and at least some of the information;

map the unique identifier to one or more licensed resources that are linked to the asset subject to and consistent with license terms that pertain to the licensed resources;

store the database entry in an asset database; and monitor the database entry to ensure the asset uses the one or more licensed resources in accordance with the license terms.

22. The centralized asset management system of claim 21, wherein the one or more identifying characteristics include manufacturers, retailers, asset type, asset model, or some combination thereof.

23. The centralized asset management system of claim 21, wherein the transmitted tag template is automatically selected from the plurality of tag templates based on arrangement of the one or more machine-readable codes, syntax of the one or more machine-readable codes, or both.

24. The centralized asset management system of claim 23, wherein the centralized asset management system includes a lookup database of known manufacturers, retailers, asset models, model numbers, or some combination thereof that is used to identify the template to be transmitted to the mobile device, the information to be extracted from the asset tag, or both.

\* \* \* \* \*